United States Patent [19]

Altmann

[11] 4,413,345
[45] Nov. 1, 1983

[54] GASDYNAMIC LASER

[75] Inventor: Konrad Altmann, Munich, Fed. Rep. of Germany

[73] Assignee: Messerschmitt-Boelkow-Blohm GmbH, Munich, Fed. Rep. of Germany

[21] Appl. No.: 386,767

[22] Filed: Jun. 9, 1982

Related U.S. Application Data

[63] Continuation-in-part of Ser. No. 268,762, Jun. 1, 1981.

[30] Foreign Application Priority Data

Jun. 11, 1981 [GB] United Kingdom ............... 8117973

[51] Int. Cl.$^3$ ................................................ H01S 3/09
[52] U.S. Cl. ................................. 372/90; 372/59; 372/58; 372/89; 372/60; 372/35
[58] Field of Search ................... 372/58, 59, 89, 60, 372/61, 35, 90; 239/555

[56] References Cited

U.S. PATENT DOCUMENTS 4,100,507 7/1978 Born et al. .......................... 372/58
4,283,686 8/1981 Daugherty et al. ................ 372/58

Primary Examiner—James W. Davie
Assistant Examiner—Leon Scott, Jr.
Attorney, Agent, or Firm—W. G. Fasse; D. H. Kane, Jr.

[57] ABSTRACT

In a gasdynamic laser in which the hot flowing lasing medium (e.g. $CO_2$—$N_2$) is cooled by expansion in a Laval nozzle 1, liquid droplets are introduced into the expanding lasing medium to increase the cooling effect. The liquid can be water, preferably heavy water, from a container 4 pressurized by the laser medium in plenum 6 and introduced from pipes 3 into a region immediately before the nozzle neck 2 so as to be atomized and accelerated through the neck 2. Evaporation occurs downstream of the neck and causes an increase in the cooling. The droplets preferably have a size in the range 1–20 μm and may contain dissolved $CO_2$. The droplets may be dispersed in a super cooled gas which is then injected into the lasing medium.

11 Claims, 1 Drawing Figure

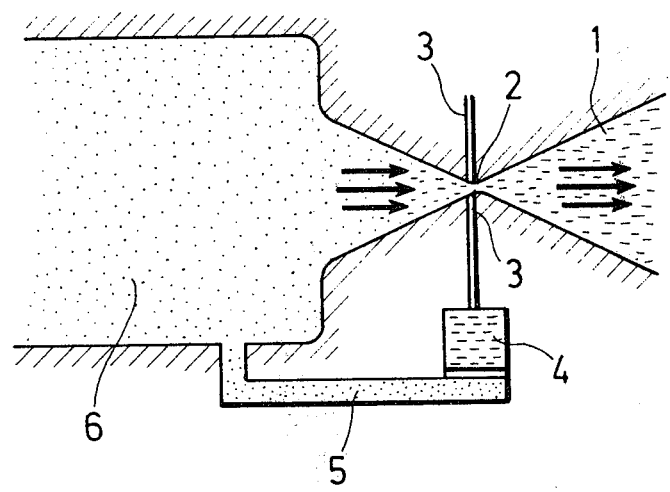

GASDYNAMIC LASER

CROSS-REFERENCE TO RELATED APPLICATION

The present application is a continuation-in-part application of my copending application Ser. No. 268,762, filed in the United States on June 1, 1981.

BACKGROUND OF THE INVENTION

The present invention relates to a gasdynamic laser and particularly but not exclusively to a gasdynamic $CO_2$ laser. Such lasers have a Laval nozzle in which the lasing medium is cooled due to the expansion downstream of the Laval nozzle. Due to such cooling of the lasing medium by expansion with the aid of the Laval nozzle, the so-called translation temperature is lowered so quickly that the vibration or oscillation energy stored in the $N_2$-molecule is subjected to a so-called "freeze up." In order to decouple or extract this energy in a resonator as radiation energy, it is necessary to reduce the translation temperature to at least room temperature. This reduction of the translation temperature is possible in a gasdynamic laser having a Laval nozzle if the stagnation temperature is within the range of 1500° to 1800° K.

However, the energy available for decoupling relative to the mass throughput increases substantially and more than proportionally with reference to a rising stagnation temperature. Therefore, it is desirable to operate such lasers at the highest possible stagnation temperature. This desirability of keeping the stagnation temperatures high ($\sim 2500°$ to $\sim 3500°$ K.) poses the problem of sufficiently lowering the translation temperature during the expansion process. For this purpose it is necessary to increase the surface area ratio $F/F^*$, wherein $F^*$ is the cross-sectional surface area of the nozzle. However, at large surface area ratios the mach numbers are high and the Laval nozzle becomes ineffective. At large mach numbers the ratio of $T_1/T_2$ approaches a limit value as follows:

$$T_1/T_2 = (F_2/F_1)^{\gamma-1}$$

wherein: $T_1$ and $T_2$ are translation temperatures at different cross-sectional areas and wherein $F_1$ and $F_2$ are these different nozzle cross-sectional areas at two different points along a flow channel and wherein $\gamma$ is the adiabatic coefficient. This value or coefficient may be, for example, approximately 1.3 for $CO_2-N_2-H_2O$ lasers.

OBJECTS OF THE INVENTION

In view of the above it is the aim of the invention to achieve the following objects singly or in combination:

to operate a gasdynamic laser in such a manner that trouble-free operation is ensured at high stagnation temperatures without necessarily satisfying the expansion conditions or ratios that had to be satisfied heretofore; and to enable a sufficient lowering of the translation temperatures while simultaneously maintaining a maximum stagnation temperature.

SUMMARY OF THE INVENTION

According to the invention there is provided a gasdynamic laser in which the lasing medium is cooled by its expansion in the Laval nozzle. The invention is characterized in that liquid droplets are introduced into the flowing lasing medium for entraining the liquid droplets in the flowing lasing medium, and for evaporating the liquid droplets in the flowing lasing medium for amplifying the cooling of the lasing medium.

According to the general teaching of the invention the principle of the Laval nozzle, namely, the temperature lowering by expansion at small mach numbers, is maintained, whereas the required additional temperature reduction is achieved by a lowering of the actual stagnation temperature. In this context the term "actual stagnation temperature" is intended to mean that temperature which the lasing medium would reach if the lasing medium were subject to an isentropic slowing down action. When exclusively using the Laval principle this so-called actual stagnation temperature is the temperature in the plenum.

The lowering of the actual stagnation temperature is achieved preferably by the evaporation of microscopically small water droplets which are entrained in the flow of the lasing medium. A theoretical estimate shows that the operational result should be better the closer the speed of the droplets corresponds to the speed of the flow of the lasing medium. When the flow of the lasing medium and that of the water droplets have substantially the same speed, the relativve change in the translation temperature can be expressed for large mach numbers M and for stagnation temperatures in the plenum within the range between 2500° and 3500° K. approximately as follows.

$$dT/T \approx -[(M^2\gamma(\gamma-1)/2+1]dw/w$$

in which $dT/T$ is the relative change in the translation temperature and $dw/w$ is the relative change in the mass throughput of the gaseous component of the flow due to the evaporation of the water droplets. This relationship shows that the temperature reduction which results from evaporation becomes more effective for larger mach numbers. Thus, the present teaching supplements the expansion principle used in Laval nozzles.

The water quantity required for effecting cooling in accordance with the invention is found to be typically within a range smaller than about 15 to 20 mol-percent.

BRIEF FIGURE DESCRIPTION

In order that the invention may be clearly understood, it will now be described, by way of example, with reference to the single FIGURE of the accompanying drawing which shows a schematic sectional view through a Laval nozzle equipped for operation according to the invention.

DETAILED DESCRIPTION OF PREFERRED EXAMPLE EMBODIMENTS AND OF THE BEST MODE OF THE INVENTION

The single FIGURE shows a Laval nozzle 1 having a housing including an upstream portion and a downstream portion separated by a nozzle neck 2. Arrows indicate the flow of the lasing medium.

The spraying may be accomplished by pipes 3 provided with minute holes through which the liquid exits into the flow of the lasing medium. The pipes 3 are connected to a water supply container 4 which may be refrigerated. The container 4 is pressurized through a conduit 5 by the stagnation pressure in the plenum 6. The minute holes in pipes 3 operate as injectors near the nozzle neck 2 for injecting the water in the form of very fine jets into the flow of the lasing medium. A plurality of injectors is positioned in close spacings along the (as shown) lower and the upper nozzle edge. Due to the high flow speed of the lasing medium the injected water jets are rapidly atomized and simultaneously accelerated to preferably assume substantially or nearly the same speed as the lasing flow. By injecting the water jets upstream of the nozzle neck 2 as shown, the droplets are exposed to a strong acceleration of the flow toward the nozzle neck.

Since the transition time of the lasing flow in the neck zone of the nozzle having a neck diameter of about 0.1 mm is typically within the range of less than one microsecond, the droplets are not evaporated upstream of the nozzle neck 2. Thus, the evaporation takes place only downstream of the nozzle neck. Boiling of the droplets and therefore a very rapid vaporization is accomplished if the pressure of the lasing gas due to the expansion drops below the vapor pressure of the droplets which depends on the temperature of the droplets. Thus, the invention achieves an effective cooling of the medium, especially at high mach numbers.

In a modification of the invention the water droplets are distributed as a fine mist in a super-cooled or under cooled gas mixture even prior to the injection. The gas mixture comprising the fine mist may also be introduced through suitable injectors into a zone adjacent to the nozzle neck 2. Suitable injectors for this purpose are disclosed in German Patent Publication No. P 3,008,425.4.

In addition to the effective cooling of the lasing medium the invention achieves yet a further advantage. Due to the lowering of the actual stagnation temperature the actual stagnation pressure increases substantially. This is of special importance to a laser system having an open circuit flow, because this fact greatly facilitates solving the problem of compressing the laser gas to atmospheric pressure after having passed through the resonator. The compression may be accomplished by means of a diffuser.

The suggested use of water for the cooling medium is based on the fact that water has a very large evaporation heat corresponding to approximately 2500 joules/gram. Thus, even small quantities of water will provide an effective cooling. Additionally, in a $CO_2-N_2$ laser water is not a foreign substance because it is being used anyway as a catalyst for emptying the lower laser or lasing levels.

However, water ($H_2O$) may also cause reduction of the oscillation energy of $N_2$ and $CO_2$ due to intermolecular impacts. With heavy water ($D_2O$) this detrimental effect is diminished whereas the cooling effect is maintained. Therefore, instead of $H_2O$-droplets also $D_2O$ droplets or liquid or water droplets enriched with $D_2O$ could be introduced into the flow of the lasing medium.

Furthermore, it may be advantageous to introduce liquid droplets enriched with dissolved $CO_2$. The laser gas may then comprise $CO_2$ at first and the "freezing up" of the oscillation energy in the $N_2$-molecules will be enhanced.

Although the invention has been described with reference to specific example embodiments, it will be appreciated that it is intended, to cover all modifications and equivalents within the scope of the appended claims.

I claim:

1. In a gas dynamic laser having a Laval nozzle with a nozzle neck for expanding and thereby cooling the flowing lasing medium downstream of said nozzle neck, wherein injection means are provided for introducing liquid droplets into the flowing lasing medium for entraining the liquid droplets in the flowing lasing medium, and for evaporating the liquid droplets in the flowing lasing medium for increasing the cooling of the lasing medium.

2. A laser according to claim 1, wherein the laser is a gas dynamic $CO_2$-laser.

3. A laser according to claim 1 or 2, wherein before evaporation, said liquid droplets are atomized to the finest droplet sizes and are accelerated near to the speed of the flowing laser medium.

4. A laser according to claim 3, wherein said atomization and acceleration of said liquid droplets is stimulated by a suitable nozzle geometry of shape and by a suitable arrangement of said injection means.

5. A laser according to claim 1 or 2, wherein said liquid droplets are water droplets atomized to a droplet size within the range of 1–20 $\mu$m.

6. A laser according to claim 5, wherein said liquid droplets are heavy water ($D_2O$) droplets or are highly enriched with heavy water.

7. A laser according to claim 1 or 2, wherein said liquid droplets are enriched with dissolved $CO_2$.

8. A laser according to claim 1 or 2, wherein said liquid droplets are injected near to said nozzle neck into the flowing lasing medium.

9. A laser according to claim 8, wherein said liquid droplets are injected upstream of said nozzle neck.

10. A laser according to claim 1 or 2, wherein said liquid droplets are spread in a cooled gas mixture in the form of a fine mist and are injected in this form into a hot flowing lasing medium near to said nozzle neck.

11. A laser according to claim 1 or 2, wherein said liquid is introduced as droplets into the neck region of said Laval nozzle by using the pressure of the laser plenum.

* * * * *